United States Patent

[11] 3,595,399

[72] Inventors Ralph L. Abos
Whittier;
Carl A. Stuewe, Hacienda Heights, both of, Calif.
[21] Appl. No. 873,724
[22] Filed Nov. 25, 1969
[45] Patented July 27, 1971
[73] Assignee Anti-Pollution Devices, Inc.
City of Industry, Calif.
Continuation of application Ser. No. 805,690, Mar. 10, 1969, now abandoned.

[54] FILTER
16 Claims, 6 Drawing Figs.
[52] U.S. Cl. .................................................. 210/266,
210/282, 210/497
[51] Int. Cl. .................................................. B01d 27/02
[50] Field of Search .......................................... 210/266,
282, 314, 315, 317, 497

[56] References Cited
UNITED STATES PATENTS
2,082,322  6/1937  Brundage ..................... 210/266 X
2,369,857  2/1945  Russell et al. ................. 210/282
3,240,347  3/1966  Zievers et al. ................. 210/497 X Primary Examiner—Samih N. Zaharna
Attorney—J. Carroll Baisch ABSTRACT: A throwaway, low-pressure, water-filtering apparatus adapted to be easily and quickly installed and removed and/or replaced.

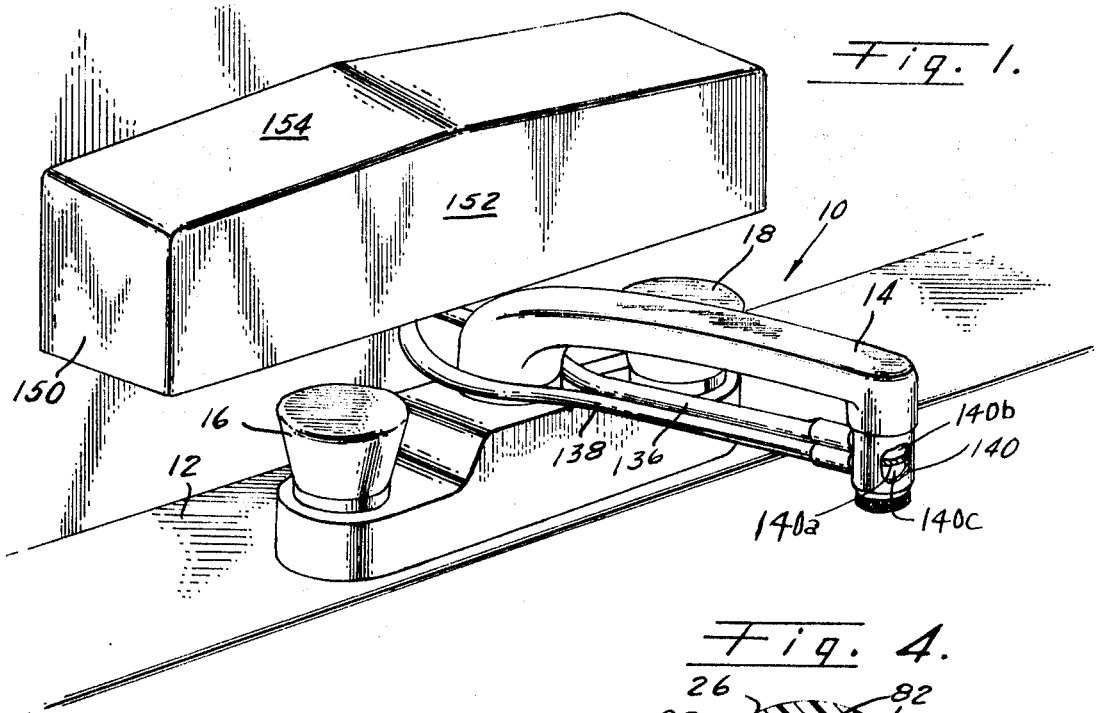
Fig. 1.
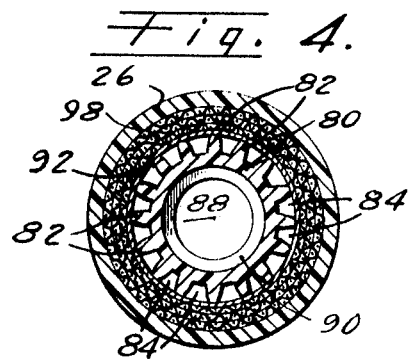
Fig. 4.
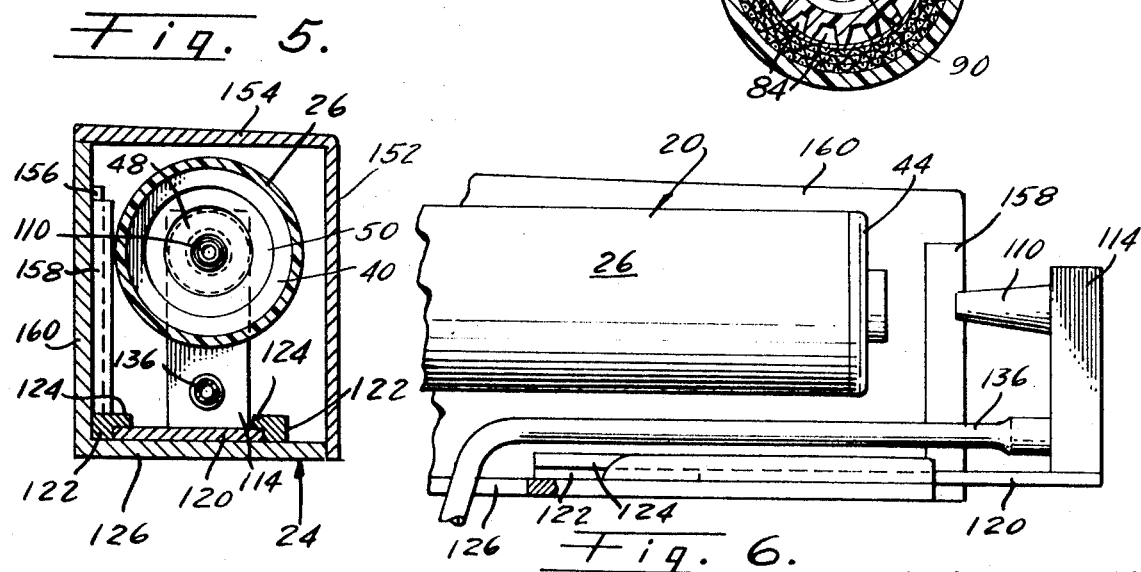
CARL A. STUEWE
Ralph L. Abos
INVENTOR.
BY J.C. Barsch
Attorney

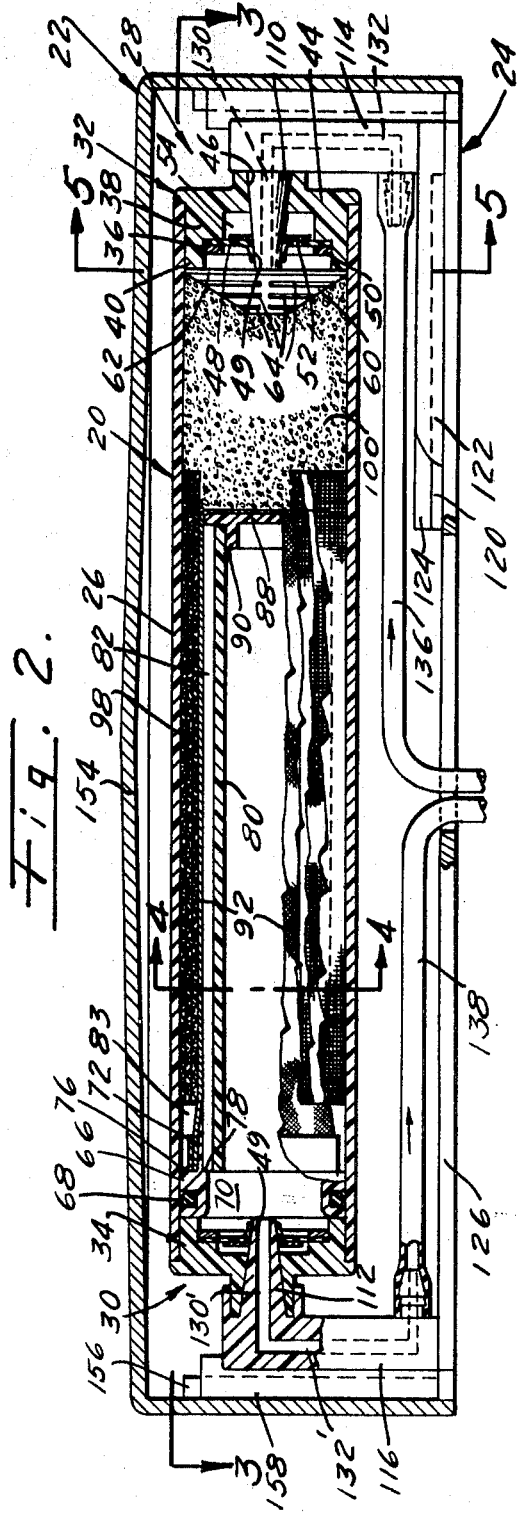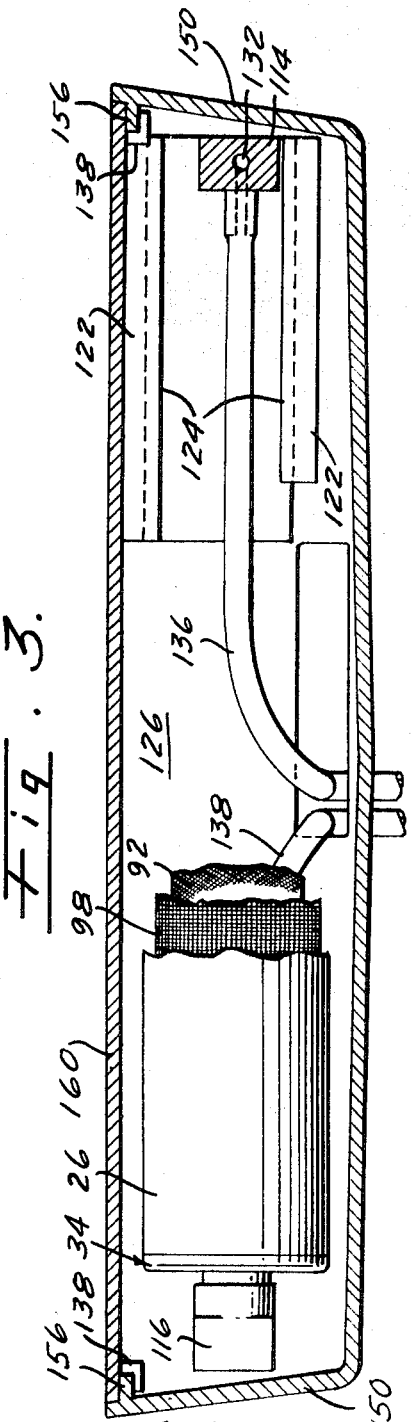
Carl A. Stuewe
Ralph L. Abos
INVENTOR.

FILTER

CROSS-REFERENCES TO RELATED APPLICATIONS

This is a continuation of applicants' copending application Ser. No. 805,690 filed Mar. 10, 1969, now abandoned.

BACKGROUND OF THE INVENTION

1. Field of the Invention

This invention relates generally to filter device and relates more particularly to domestic water-filtering apparatus for home use.

2. Description of the Prior Art

There are various types of filters in the prior art for filtering out foreign materials in water but these generally are relatively bulky, and are difficult to install, service, or replace when this is required.

BRIEF SUMMARY OF THE INVENTION

There is an outer shell of plastic or other suitable material in which there is an externally corrugated tubular sleeve about which is a filter cloth surrounded by a plurality of layers of fiber glass screening, the corrugations running longitudinally of the sleeve.

A body of activated carbon and diatomaceous earth is in the shell upstream of the tubular sleeve, filter cloth, and screening, the incoming water flowing through the body of activated carbon and diatomaceous earth, through the screening and filter cloth, and thence in the channels between the ridges on the exterior of the tubular sleeve. Connectors for easily, quickly, and accurately connecting the apparatus and easily and quickly disconnecting said apparatus are provided at the ends of the housing and there is means for releasably securing the connectors in the ends of the apparatus.

OBJECTS OF THE INVENTION

It is an object of the invention to provide filtering apparatus that is relatively small in size but which will filter a relatively great amount of water before becoming ineffective as a filter.

It is another object of the invention to provide filtering apparatus of this character that is relatively inexpensive.

It is still another object of the invention to provide filtering apparatus of this character that is disposable when it becomes ineffective for filtering water.

A further object of the invention is to provide filtering apparatus of this character that removes taste and odors from the water.

A still further object is to provide apparatus of this character that removes turbidity, all suspended foreign matter, and undissolved solids.

Another object of the invention is to provide crystal clear, beverage quality water.

Still another object of the invention is to provide apparatus of this character that operates under a minimum of pressure.

A further object of the invention is to provide apparatus of this character that is shock proof.

The characteristics and advantages of the invention are further sufficiently referred to in connection with the following detailed description of the accompanying drawings which represent one embodiment. After considering this example, skilled persons will understand that many variations may be made without departing from the principles disclosed and we contemplate the employment of any structures, arrangements, or modes of operation that are properly within the scope of the appended claims.

Referring to the drawings, which are for illustrative purposes only:

FIG. 1 is a perspective view of apparatus embodying the invention;

FIG. 2 is a longitudinal sectional view of the filter apparatus embodying the invention;

FIG. 3 is a sectional view taken on line 3–3 of FIG. 2;

FIG. 4 is a sectional view taken on line 4–4 of FIG. 2;

FIG. 5 is a sectional view taken on line 5–5 of FIG. 2; and

FIG. 6 is a side elevational view of one end of the apparatus showing the movable connector member removed from the adjacent end of the filter.

Referring more particularly to the drawings, there is shown a mixing faucet, indicated generally at 10, installed on a sink 12, said faucet including a spout 14 and hot and cold water valves having handles 16 and 18 respectively.

A filter assembly, indicated generally at 20, is disposed in a housing, indicated generally at 22, removably disposed on a support, indicated generally at 24.

Filter assembly 20 comprises an outer tubular shell 26 with open ends, the shell being of any well-known relatively stiff plastic. Water enters the filter assembly at one end which is termed the inlet end 28, the opposite end being termed the outlet end 30.

At the inlet and outlet ends the tubular shell 26 is provided with closures, indicated generally at 32 and 34 respectively also of plastic or other suitable material. Closure 32 has a cylindrical part 36 the wall of which has a thickened part 38, there being an internal shoulder 40 at the inner end of the thickened part. There is an outer end wall 44 having a greater diameter than the cylindrical part 36, the diameter of said end wall being substantially the same as the external diameter of the shell 26 and abuts against the adjacent end of said shell. Closure 32 also has an annular, axial, outward extension and there is an axial opening 46 through the wall end 44 and the extension, said opening tapering inwardly so as to be larger at the outer end than at the inner end.

A peripheral portion of a gasket 48 of any suitable material such as rubber, plastic, or the like, is disposed on the shoulder 40 and is held thereon by a retainer ring 50 which if fitted in place.

Normally the gasket is flat and has a central opening therein. A washer 52 is disposed in an annular chamber 54 within the closure and between the gasket and the outer end wall of the closure. The washer is of smaller external diameter than the diameter of the chamber and has an axial opening therein.

The closure is permanently secured within an end portion of the shell 26 by a suitable adhesive such as an epoxy cement, for example, such cement being well known.

At the inner end of the closure 32 is a hollow fluid distributor 60 of generally frustoconical shape the large end of which has a cylindrical part 62 which abuts against the inner end of the closure 32, the smaller end facing inwardly of the shell. There are a plurality of arcuate slots 64 forming a series of interrupted concentric circles in the frustoconical part of the distributor, said circles being spaced apart longitudinally of the distributor and being progressively smaller toward the free inner end. The fluid flow is from the hollow interior of the distributor outwardly through said slots 64 which are of such size and number as to effect controlled flow of fluid therethrough and substantially uniform distribution of fluid throughout the cross-sectional area of the filter.

Closures 28 and 30 are of similar construction, the parts of the closure 30 being given the same numerals as corresponding parts of closure 28 except that the numerals of closure 30 have a prime added to them. Closure 30 is also permanently secure in the shell 26 by a suitable adhesive such as an epoxy cement.

At the inner end of the closure 30 there is a collar 66 having an external groove in which is disposed an O-ring 68 providing a seal between the collar and the inner side of the wall of the shell 26. Collar 66 has an opening 70 therethrough and there is an annular flange 72 extending axially inwardly of the filter. Flange 72 is relatively thin and of smaller outside diameter than the inside diameter of the shell, the inside diameter of said flange being greater than the opening 70. Thus there is a portion of inner end of the collar outwardly of the flange 72 and inwardly thereof forming shoulders 76 and 78 outwardly and inwardly of the flange. The flange tapers toward its free end.

Within the shell 26 is a longitudinally extending hollow tube, indicated generally at 80, aid tube having longitudinally extending external rib 82 spaced apart annularly by channels 84 so that the tube 80 is externally corrugated. Tube 80 is of less length than the shell 26 and one end portion of said tube is disposed within said flange 72 with the end abutting against the internal shoulder 78 of the collar 66. It is to be noted that the depth of the channels is such that there is fluid communication between said channels and the opening 70 in the collar as best shown in FIG. 2.

Radially the ribs 82 terminate in a common cylindrical plane the diameter of which is smaller than the inside diameter of the shell 26 so that there is an annular space 83 between said plane and the inside of the shell 26. At the end of the tube 80 opposite the collar 66 there is a plug 88 having a reduced diameter portion 90 which fits within the tube 80, said cap extending outward to cover the ribs and channels of the tube 80. If desired, the cap may be press fitted in the tube, or cemented therein.

A sleeve 92 of filter cloth of any suitable character is disposed on the tube 80, the free end of the sleeve being at the collar end and a free end portion extends over and about the exterior of the flange 72 of said collar and is secured on the flange by a retaining ring 94 of plastic or other suitable material, said ring 94 being press fitted in place. While various filter cloths may be used, canton flannel has been found to be highly effective and one layer is sufficient. This fabric or cloth is napped on one side and the nap is at the outer side of the sleeve.

In the space 83 between the tube 80 and the shell 26 there are a plurality of layers of screening 98 which are wrapped about the filter cloth to retain same in place. While window mesh screening has been found to be very satisfactory, the screening may be of any suitable size. Further a fiber glass screening has proved to be very satisfactory although the screening may be of any other suitable material, plastic or metal. A sufficient number of layers of the screening should be used to substantially fill the space 83. The screening also extends longitudinally outwardly of the plug 88, as best shown in FIG. 2.

The plug 88 is spaced inwardly of the end of the shell having the closure 32 to provide a chamber for a body of filtering material 100. This body of filtering material is a mixture of activated carbon and diatomaceous earth. It has been found that an effective and satisfactory mixture comprises 75 percent of 10 to 30 micron activated carbon and 25 percent of diatomaceous earth although the ratio of these materials may vary according to the requirements of various situations and/or conditions.

Water is supplied to the filter assembly by means of a nipple 110 and is carried away through a nipple 112 at the opposite end, these nipples being termed respectively the inlet nipple and the outlet nipple.

These nipples are formed integrally with carrier blocks 114 and 116 respectively, taper toward their free ends so that they are frustoconical in shape, and are axially aligned.

The carrier blocks 114 and 116 are carried by slide members 120 respectively and are shown as being integral with said slide members, although they may be attached thereto by any suitable means. Each slide member slides in a pair of parallel, laterally spaced guide members 122 each of which has a longitudinally extending, flange 124 spaced upwardly from a bottom plate 126 of the support 24, said guide member being secured to said plate by any suitable means such as spot welding, brazing, or the like although said guide members may be integral with said plate 126. Side edge portions of the slide members are slidingly disposed beneath the flanges 124 and the side edges of said slide members slide against said guide members. Thus the slide members 120 are slidingly guided on the plate 126.

The nipples 110 and 112 have fluid flow passages 130 therethrough which are connected with flow passages 132 in the carrier blocks. These passages extend through fixtures 134 adjacent the bottoms of said blocks and flexible tubes or conduits 136 and 138 are attached to respective fixtures. Tube 136 is adapted to be connected to a source of water to be filtered and the tube 138 is connected to a point of discharge. As shown in FIG. 1, the spout 14 has a diffuser 140 screwed into the free end of said spout, said diffuser having a horizontal partition 140a therein dividing the diffuser into an inlet chamber 140b and outlet chamber 140c, the latter discharging at the free end of the diffuser.

Tube 136 is connected to a fitting communicating with the inlet chamber and tube 138 is connected to a fitting communicating with the outlet chamber.

With the tubes 136 and 138 connected to the diffuser 140 as above described, and with housing 22 removed from the support the carrier blocks 114 and 116 are pulled outwardly a sufficient distance for the free ends of the nipples 110 and 112 to be separated a greater distance than the length of the filter assembly. The openings 46 are aligned with the nipples 110 and 112 and the carrier blocks pushed inwardly into said openings. Nipples 110 and 112 are of sufficient length to extend through the central openings 49 in the gaskets 48 and 48' when the nipples are pushed inwardly as far as the carrier blocks will permit, said carrier locks being limited in their inward movement by engagement with the outer ends of the closure extensions as best shown in FIG. 2. These openings 49 are normally smaller than the diameter of the free ends of said nipples 110 and 112 so that when the nipples are pushed through said openings the material surrounding said openings is pushed inwardly and against the end portions of said nipples thereby providing a tight seal with the nipples. Also, when the nipples are pushed inwardly in the closures 32 and 34 they pick up the washers 52 and 52', the central holes of which are somewhat greater diameter than the external diameter of the free ends of said nipples. However, the holes in said washers are of smaller diameter than the diameter of the nipples a short distance from said free ends. Thus the washers are picked up by the nipples and moved to a position adjacent the gaskets and thereby provide a backing for the central portions of the gaskets which prevent the gaskets being forced outwardly on the nipples and allow bypassing of water.

The carrier blocks are held against inadvertent outward movement by end walls 150 of housing 22, as best shown in FIG. 3. Housing 22 has a front wall 152 and a top wall 154 but no bottom or back walls. Adjacent the free back edges of the end walls 150 are vertical flanges 156 which are slidingly received in outwardly opening guides 158 carried by a vertical backwall 160 of the support 24 adjacent the ends of said backwall, said guide being shown as being integral although the may be separate pieces secured to the backwall 158 by any suitable well-known means. The housing 22 is slipped onto the support 24 by sliding the flanges 156 downwardly in the guides 158. The housing is limited in its downward movement by engagement of a back edge portion of the top 154 with the vertical backwall 160 of the support 24.

The housing 22 when on the support 24 not only serves as a protective cover for the filter assembly and holds the carrier blocks in against outward movement but is decorative.

When filtered water is desired the handles or knobs 16 and/or 18 are turned to open the valves to which they are secured. Water then flows through the spout and into the inlet chamber of the diffuser and thence through the conduit or tube 136, passage 132 in the carrier block 114 and passage 130 in the nipple 110. The water then flows through the distributor 60 and through the mixture of activated carbon and diatomaceous earth, through the screening and canton flannel and thence into the channels 84 between the ribs 82 of the tube 26, into the opening 70 and out through the passage 130' in nipple 112, passage 132' in carrier block 116, through the tube 138 and thence into the discharge chamber of the diffuser 140 from which the filtered water is discharged.

When the water introduced into the filter assembly at the inlet and thereof flows through the body 100 of filter material it carries some of the diatomaceous earth along through the screening 98. The water flows through the canton flannel but the diatomaceous earth carried along with the water is trapped by the napped outer surface of the canton flannel and coats said surface. This does not interfere with the flow of water through the filtering fabric. The screening prevents the diatomaceous coating from falling off the canton flannel.

When the filter loses its effective filtering action the housing 22 is removed from the support 24, the carrier blocks pulled outwardly so the nipples 110 and 112 clear the ends of the filter assembly, and the filter assembly removed and disposed of since it is a throwaway apparatus or device. A new filter is then installed as above described. It will be apparent from the foregoing that the changing of the filter requires but a few minutes at most.

In operation the charcoal takes out undesirable tastes and odors while the diatomaceous earth takes out turbidity, all suspended foreign matter, and undissolved solids. The filtered water is crystal clear and of high quality.

We claim:

1. Fluid-filtering apparatus, comprising;
   A. An elongated tubular shell;
   B. inlet and outlet closure means for respective ends of said shell, each closure means having a passage therethrough;
   C. a hollow externally corrugated tube disposed within the shell, said tube being of smaller external diameter than the internal diameter of the shell to provide an annular space between said tube and shell, said tube also being shorter than the shell and having one end adjacent the outlet closure means, the other end being spaced from the inlet closure means;
   D. means closing the latter end of said tube against the flow of fluid therethrough;
   E. a sleeve of filter cloth disposed over the tube;
   F. at least one layer of mesh means over the filter cloth, said mesh means being in the space between the tube and shell and holding the filter cloth securely in position;
   G. and a body of filtering material in the space between the inlet closure and the adjacent end of the tube whereby fluid to be filtered flows through said filtering material, sleeve, and mesh means and thence into and along said corrugated tube and exits from the outlet end of said shell.

2. The invention defined by claim 1, wherein the mesh means comprises screening.

3. The invention defined by claim 2, wherein the filtering material comprises a mixture of activated carbon and diatomaceous earth.

4. Fluid-filtering apparatus, comprising;
   A. an elongated tubular shell;
   B. inlet and outlet closure means for respective ends of said shell, each closure having a passage therethrough;
   C. a hollow tube disposed within the shell, said tube having longitudinally extending external ribs apart by longitudinally extending channels, said tube being of smaller external diameter than the internal diameter of the shell to provide an annular space between said tube and shell, said tube also being shorter than the shell and having one end adjacent the outlet closure, the other end being spaced from the inlet closure;
   D. means closing the latter end of said tube;
   E. a sleeve of filter cloth disposed over the tube;
   F. at least one layer of screening over the filter cloth, said screening being in the space between the tube and shell and holding the filter cloth securely in position;
   G. and a body of filtering material in the space between the inlet closure and the adjacent end of the tube, said filtering material comprising a mixture of activated carbon and diatomaceous earth.

5. The invention defined by claim 4, wherein the filtering cloth comprises canton flannel napped on at least one side and with the nap at the outer side.

6. The invention defined by claim 5, wherein there are a plurality of layers of screening over the flannel, said screening filling the space between the tube and the shell.

7. The invention defined by claim 4, including a distributor within the shell and adjacent the inlet closure.

8. The invention defined by claim 4, including a flexible seal secured to each of the closures, said seals having relatively small central opening therein.

9. The invention defined by claim 8, wherein the closure means have chambers therein at the outer sides of the respective seals, and there is a washer floating in each of said chambers, said washers having a central opening therein aligned with the openings in said seals to provide backing for the flexible seals.

10. The invention defined by claim 4, including a collar disposed against the outlet closure means, said collar having an opening therethrough in communication with the channels in the tube, said collar having a relatively thin flange extending longitudinally inwardly and the open end of the sleeve of filter cloth extends over said flange; and means securing said open end of the sleeve on said flange of the collar.

11. The invention defined by claim 8, including a nipple at each end of the filter apparatus receivable in the passages in the closures; and carrier means for said nipples, said carrier means being mounted for movement toward and away from each other, said nipples being moved into and out of said passages in the closures, the openings in the washers and the flexible seals, to thereby provide inlet and outlet connection for the filter, said washers being disposed on the nipples and positioned adjacent to the flexible seals to provide backing for the flexible seals.

12. The invention defined by claim 11, including support means, said support means having guides at the ends; respective slide members slidably disposed in said guide for longitudinal movement, said carrier means being mounted on respective slide members whereby the carrier means and their respective nipples are movable toward and away from each other into and out of the passages of the inlet and outlet closures.

13. The invention defined by claim 12, including means for retaining the nipples in the passages.

14. The invention defined by claim 13, wherein said means for retaining the nipples in the passages comprises a housing having end walls, said housing being removably mounted on the support means with the end walls thereof positioned adjacent the nipple carrier means to retain said carrier means in their inward position whereat the nipples are disposed in the passages of the closures.

15. The invention defined by claim 4, wherein the closure are permanently secured in the ends of the shell, said filtering apparatus being a throwaway filtering apparatus.

16. The invention defined by claim 4, including a diffuser attachable to the spout of a faucet, said diffuser having an inlet chamber and an outlet chamber separated from each other, said inlet and outlet closures having means for connecting same respectively to the inlet and outlet chambers of said diffuser.